Sept. 5, 1961  W. G. ANDERSON, JR., ET AL  2,998,909
DOUBLE BOX CARRIER
Filed June 13, 1958  3 Sheets-Sheet 1

INVENTORS
WILBUR G. ANDERSON JR.
ROBERT J. BLETT
BY Price and Heneveld
ATTORNEYS Sept. 5, 1961     W. G. ANDERSON, JR., ET AL     2,998,909
DOUBLE BOX CARRIER Filed June 13, 1958     3 Sheets-Sheet 2

INVENTOR.
WILBUR G. ANDERSON JR.
BY    ROBERT J. BLETT

Price and Heneveld

ATTORNEYS

Sept. 5, 1961   W. G. ANDERSON, JR., ET AL   2,998,909
DOUBLE BOX CARRIER

Filed June 13, 1958   3 Sheets-Sheet 3

INVENTOR.
WILBUR G. ANDERSON JR.
BY ROBERT J. BLETT

Price and Heneveld

ATTORNEYS

United States Patent Office 2,998,909
Patented Sept. 5, 1961

2,998,909
DOUBLE BOX CARRIER
Wilbur G. Anderson, Jr., and Robert J. Blett, Grand Rapids, Mich., assignors to Packaging Corporation of America, a corporation of Delaware
Filed June 13, 1958, Ser. No. 741,811
2 Claims. (Cl. 229—34)

This invention relates to boxes which are formed from flat blanks to provide an open face carrier for agricultural products such as fruits and vegetables.

It is common for fresh farm produce to be placed in open boxes for customer inspection. Potatoes, apples, pears, etc., are usually placed in an open basket of bushel, half bushel, or smaller size. Tomatoes, peaches, etc., which are more easily bruised are placed in smaller baskets. Berries, grapes, cherries and smaller fruits and vegetables are usually displayed in open quart size containers. Neither the bushel or smaller baskets nor the quart containers are suitable for stacking, when full. They also take up considerable storage space when empty even though they may be partially telescoped within each other.

It is an object of this invention to disclose a box which may be formed from a flat blank and which, as erected, is suitable for carrying and displaying fresh farm products. The flat blanks require very little storage space and may be easily erected when needed. They may also be stacked one on top of the other for a greater conservation of space.

Another object of this invention is to disclose a box which may be formed to double size and may later be separated to provide two distinct boxes. This provides a larger box for display and storage purposes which is easier to handle, encourages the consumer's purchase of double the quantity, and still provides a smaller package readily separated from the larger where necessary.

A further object of this invention is to disclose a carrier box which may be quickly erected and is of sturdy construction in its erected form. The box of this invention includes walls of double thickness, interlocked and reinforced corner areas, and partial cover walls for still greater stability. The end structure of the box is simple and quick to erect. It includes a temporary locking feature to hold the end structure assembled while other parts of the box are being erected.

A still further object of this invention is to provide a separator wall structure for a double box which, when desired, also serves as an end closure for the single box form. The separator walls are interlocked to the side walls of the box structure in the forming of the box. They also include a partial cover wall and cooperative locking ears for securing the cover wall to the side walls of the box.

Still another object of this invention is to provide a carrier box with means of adequate protection and ventilation for the products carried therein. The corner areas of the box are reinforced and extend slightly above the side edges thereof. This enables the boxes to be stacked on top of each other and protects the contents from being squashed or damaged. The space between the stacked boxes provides a ventilation space and a means of lifting one or a group of boxes off from the others.

It is also an object of this invention to disclose a simple and inexpensive form of blank from which this box can be made. The blank makes maximum use of the material and leaves very little scrap loss. A double box blank is preferably made and may later be separated to form a single box if desired. The blank is symmetrical about lateral and transverse center lines.

These and other objects and advantages in the practice of this invention will be more apparent in the illustration and description of a working embodiment of the invention, as hereinafter set forth.

Figure 1:
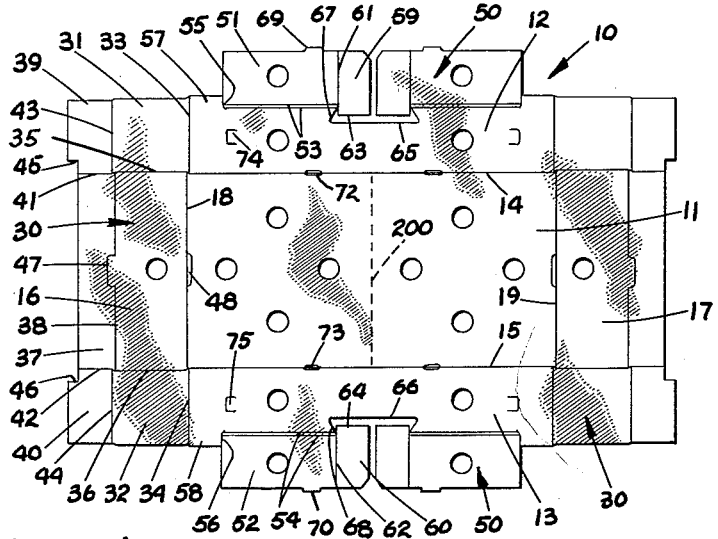
FIG. 1 is a plan view of the flat blank from which the double size carrier box is made.
Figure 2:
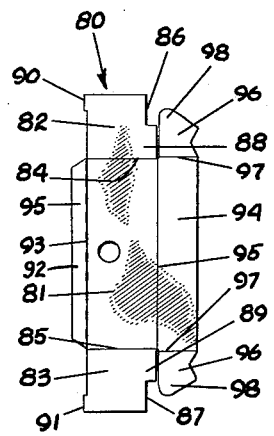
FIG. 2 is a plan view of the flat blank from which the divider walls of the double box or closure walls of the single box are formed.

Referring to the drawings in further detail, a flat box forming blank 10 is shown in FIG. 1. The blank includes a bottom wall 11 having side walls 12 and 13 connected to opposite edges thereof and separated therefrom by fold lines 14 and 15. End walls 16 and 17 are connected to the bottom wall 11 by fold lines 18 and 19.

The box forming blank 10 includes a perforated separation line 20 formed normal to the side walls 12 and 13 and between the end walls 16 and 17. The separation line 20 divides the blank 10 into two parts which are symmetrical on opposite sides of the line. As will be shown, the blank 10 may be erected to form a double sized box. It may also be separated on line 20, either before or after forming the double box, to form two separate single carrier boxes.

In the view of the symmetry of the blank 10 the following description will be directed to only one symmetrical part. However, it is to be understood that the parts of the blank on the other side of line 20 are mirror reflections of the parts which will be referred to and are designated by numerals.

The blank 10 includes an end wall forming part 30 which is inclusive of the end wall 16. The side walls 12 and 13 include end wall flaps 31 and 32 separated from the side walls by fold lines 33 and 34. The end wall flaps 31 and 32 are separated from the end wall 16 by separation lines 35 and 36.

A partial cover wall 37 is connected to the end wall 16 and is separated therefrom by a fold line 38. The partial cover wall 37 includes side wall flaps 39 and 40 at each end thereof. The side wall flaps 39 and 40 are separated from the partial cover wall 37 by fold lines 41 and 42 and are separated from the end wall flaps 31 and 32 by separation lines 43 and 44. The side wall flaps 39 and 40 will be noted to include stepped shoulders 45 and 46.

The end wall forming part 30 of the blank 10 also includes a stacking stop 47 which is formed from the partial cover wall 37 and interrupts the fold line 38 between the partial cover wall and the end wall 16. A stacking stop receiving access 48 is formed in the fold line 18 between the bottom wall 11 and the end wall 16. This access is to receive the stacking stop of a different carrier box.

The box forming blank 10 includes certain side wall forming structure 50 at each side thereof. The side wall forming structure 50 is inclusive of the side walls 12 and 13 and further includes overlapping side wall members 51 and 52. The side wall members 51 and 52 are connected to the side walls 12 and 13, respectively, by double fold lines 53 and 54. The double fold lines 53 and 54 are spaced inwardly from the outer edge of the side walls and accordingly separation cuts 55 and 56 are provided near their ends. This leaves the corner crowns 57 and 58 provided from the side walls 12 and 13, respectively.

The overlapping side wall members 51 and 52 include corner post flaps 59 and 60 connected to the overlapping member by fold lines 61 and 62 respectively. The corner post flaps 59 and 60 include crown ends 63 and 64. The ends 63 and 64 of the flaps 59 and 60 are disposed within cutouts 65 and 66 formed within the side walls 12 and 13 respectively. The side walls 12 and 13 are cutout at 65 and 66 in a manner to include undercut shoulders 67 and 68.

As will be shown in the forming of the blank 10, subsequently, the crown ends 63 and 64 of the corner flaps 59 and 60 will be disposed to complement the corner crowns 57 and 58 of the side walls 12 and 13 when the side wall members 51 and 52 are folded in overlapping position.

The overlapping side wall members 51 and 52 are formed to include locking tabs 69 and 70 on their outer edges. In the folding over of the side wall members 51 and 52 these locking tabs 69 and 70 are received and engaged within apertures 72 and 73 formed in the fold lines 14 and 15 between the side walls 12 and 13 and the bottom wall 11. The tab receiving apertures 72 and 73 are disposed near the separation line 20, for reasons which will be later described.

The side walls 12 and 13 of the blank 10 are formed to include punch out tabs 74 and 75 near the end forming structure 30. The tabs 74 and 75 are hinged to the side walls and have their free end disposed towards the end forming structure 30.

The blank 10 will be noted to include multiple breather holes. These have not been designated by number in order to avoid confusion. However, it is felt that they are readily recognizable and are distinguishable from other structure. They provide ventilation access through the carrier boxes as finally formed.

The double size box which is formed by the blank 10 may be separated into two parts by the use of divider wall blanks 20. As will be shown and described later, the divider wall blanks 80 also serve as end closure members for the single carrier box.

The divider wall blanks 80 include a separator wall 81 having side wall flaps 82 and 83 connected thereto and separated therefrom by fold lines 84 and 85. The side wall flaps 82 and 83 include step shoulders 86 and 87. They also include crowns 88 and 89. Locking tabs 90 and 91 are formed on the side wall flaps 82 and 83 near their ends.

A bottom wall overlaying flap 92 is connected to the separator wall 81 by a fold line 93 and includes relief cuts to make the folding of the bottom wall flap 92 easier.

A partial cover wall 94 is connected to the separator wall 81 by a fold line 95. The cover wall 94 includes locking ears 96 at each end connected thereto by fold lines 97. The locking ears 96 include extended ends 98. The ears are spaced apart from the side wall flaps 82 and 83.

Figure 3:
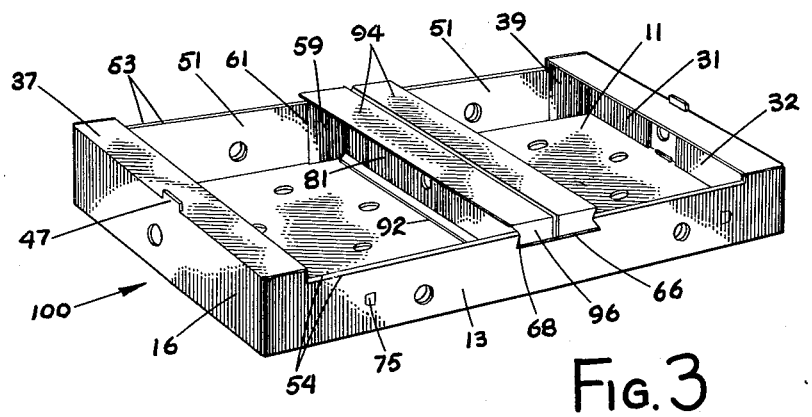
FIG. 3 is a perspective view of the double carrier box including divider walls.
Figure 4:
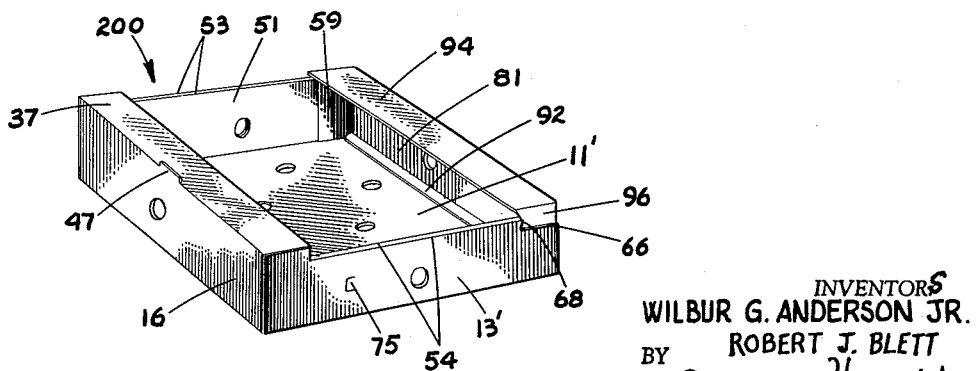
FIG. 4 is a perspective view of a single carrier box as made alone or as separated from a double box.

The double blank 10 may be used with two separator wall blanks 80 to form a double carrier box 100, such as is shown by FIG. 3. The double carrier box 100 may be separated to form two single carrier boxes 200 such as is shown by FIG. 4. This may be done by either using one-half of the double blank 10 and one of the end closure blanks 80 to form a single box, or by separating the double box 100 on the separation line 20 provided in the bottom wall of the double box forming blank.

Since the double carrier box 100 and the single carrier box 200 are, in effect, formed from the same blank, common parts of both boxes have been designated by the same numbers. In those instances in which there is a difference in a part, without a distinction, I have used a suffix mark in referring to the part in the single box. For example, the side walls 12 and 13 and the bottom wall 11 are designated by suffix marks in the single box since they do not have the full form described with respect to the double box. However, they are essentially the same numbers and so are considered deserving of the same numeral designation.

Figure 5:
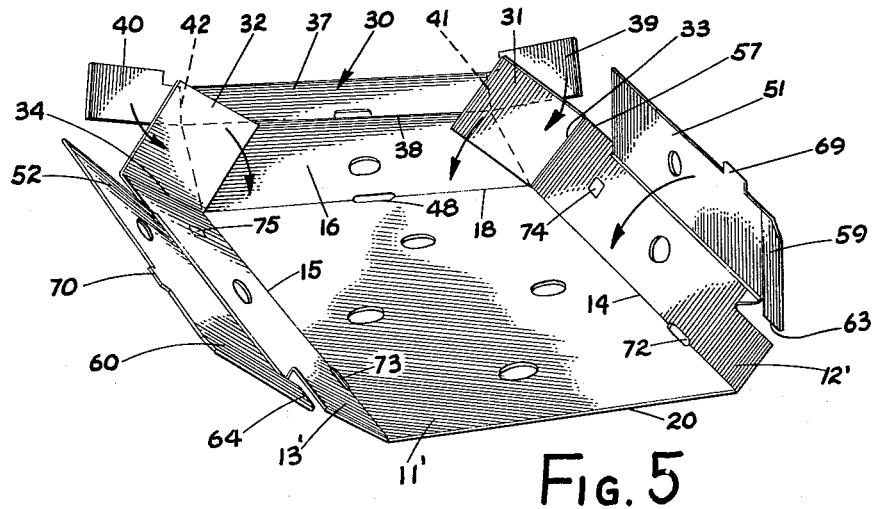
FIG. 5 is a perspective view of a part of the box forming blank in a partially erected state.

In both the double carrier box 100 and the single form of box 200 the end structures 30 are erected in the same manner. This is best described with reference to the single box 200 of FIG. 5.

The end flaps 31 and 32 are folded on lines 33 and 34 normal to the side walls 12' and 13'. The side walls 12' and 13' are then erected to a position normal to the bottom 11' by being folded on lines 14' and 15'. The end wall 16 is next folded on line 18 to a position normal to the bottom wall 11'. The end wall flaps 31 and 32 will then lay closely adjacent to the end wall 16. Their ends are spaced apart as is shown in FIG. 6.

The side wall flaps 39 and 40 are next folded on lines 41 and 42 to lie normal to the cover wall 37. The cover wall 37 is folded on line 38 to lie normal to the end wall 16. The side wall flaps 39 and 40 are then swung over the end flaps 31 and 32 and are disposed next adjacent to the side walls 12' and 13'. This is shown by the arrows in FIG. 5 originating from the flaps 39 and 40.

In the folding of the end structure 30 the side wall flaps 39 and 40 tend to spring out against the side walls 12' and 13'. However, the side walls 12' and 13' are prevented from folding out due to the engagement of the ends of the end wall flaps 31 and 32 with the partial cover wall 37. In order to hold the partial cover wall 37 in its erected position the tabs 74 and 75 are punched in so that their free ends engage and frictionally hold the side edges of the side wall flaps 39 and 40. This is best shown in FIG. 6 with respect to the side wall flap 40 and the tab lock 75.

Figure 6:
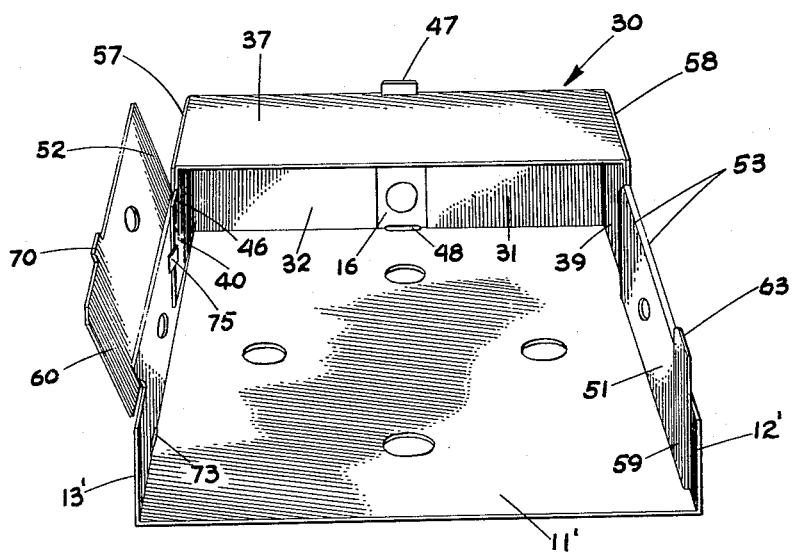
FIG. 6 is a perspective view of a part of the box forming blank as partially erected.

Referring to FIG. 6, at the left, the tab 75 is shown at it is used to temporarily hold the side wall flap 40 and thereby keep the end structure 30 in its erected position. At the right side, in FIG. 6, the overlapping side wall member 51 is shown as used to complete the end structure locking operation. When the overlapping side wall members 51 and 52 are folded over on their double fold lines 53 and 54 they capture between themselves and the side walls 12' and 13' the ends of the side wall flaps 39 and 40. The overlapping members 51 and 52 are received and folded over the stepped shoulders 45 and 46 of the side wall flaps 39 and 40. The locking tabs 69 and 70 of the overlapping side wall members 51 and 52 are lockingly received within the accesses 72 and 73 of the bottom wall 11.

The end wall structure 30 includes reinforced corners provided by the ends of the side walls 12 and 13 and the side wall flaps 39 and 40 adjacent thereto. The reinforced corners will enable the box to subsequently be stacked with other boxes.

In those instances where dividers are used with the double box 100, or as a closure for the single box 200, the divider or closure walls 80 are erected and assembled with the rest of the box prior to the folding over of the overlapping side wall members 51 and 52. The assembly is the same in either instance however for clarity the assembly operation is described with respect to the single box form.

Figure 7:
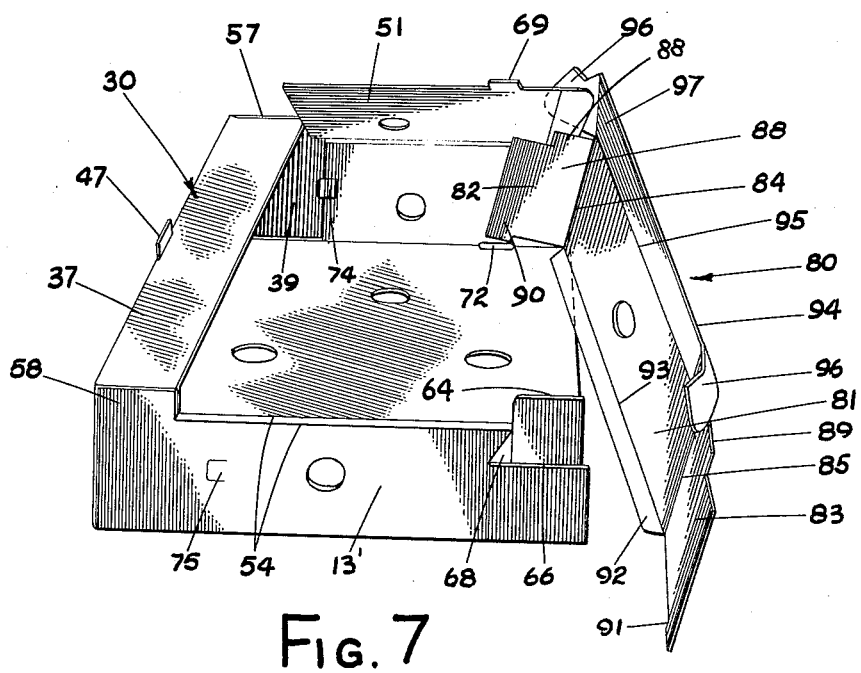
FIG. 7 is a perspective view of a single carrier box having the end closure assembled thereto.

Referring to FIG. 7 the side wall flaps 82 and 83 of the blank 80 are folded on lines 84 and 85 to lie normal to the separator or closure wall 81. The bottom overlay 92 is folded on line 93 to lie normal to the wall 81. The locking tabs 90 and 91 of the side wall flaps 82 and 83 are engaged into the apertures 72 and 73. The overlapping side wall members 51 and 52 are then folded on their double fold lines 53 and 54. As the overlapping wall members 51 and 52 are moved into position the corner reinforcing flaps 59 and 60 are bent back on their fold lines 61 and 62 to pass over the corner crowns 88 and 89 of the side wall flaps 82 and 83. This is actually a reverse folding so that the reinforcement flaps 59 and 60 spring back into place once they are past the corner crowns of the side wall flaps. The overlapping side wall members 51 and 52 engage both the side wall flaps of the end wall structure 30 and those of the closure wall blank 80 between themselves and the side walls 12′ and 13′. They are locked in place by their tabs 69 and 70 being received, with the locking tabs 90 and 91 of flaps 82 and 83, in the accesses 72 and 73.

Figures 8, 9:
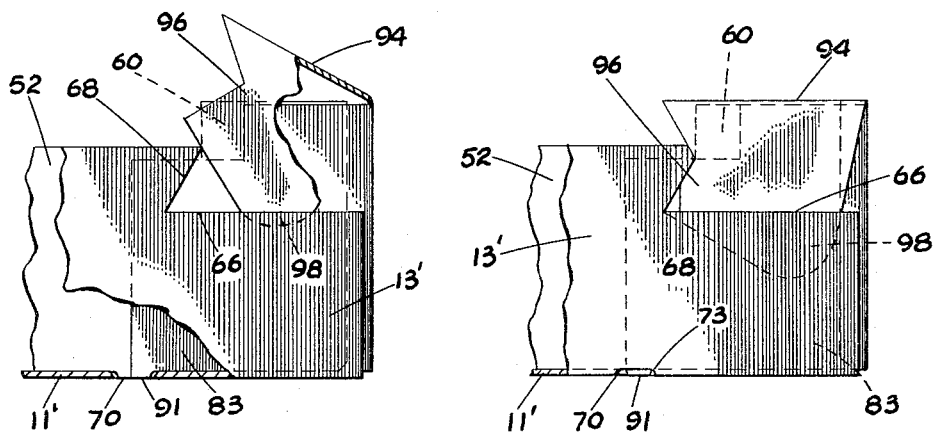
FIG. 8 is a side plan view of the closure end of a single box showing the locking ears of the cover wall being snapped into place.
FIG. 9 is a side view of the closure end of a single box showing the cover wall locking ears as finally assembled.

The cover wall 94 of the closure blank 80 is then folded on line 95 and the locking ears 96 are folded on lines 97. The extended ends 98 of the locking ears 96 are tucked between the side wall 12′ and 13′ and the respective side wall flap 82 or 83 of the closure member 80. As the cover wall 94 is brought into position normal to the closure wall 81, the ears 96 snap over the undercut portions 67 and 68 of the undercut side walls and are engaged thereunder against inadvertent removal. This is best shown by FIGS. 8 and 9. The form of the locking ear 96 is such as is readily received by the undercut portions 68 of the cutaway section 66 of the side wall 13′ as is shown by these drawings.

The carrier boxes 100 or 200, as erected, include many desirable features.

Both boxes include reinforced walls and have securely interlocked corner structures. The corner areas of the boxes serve as reinforced posts for stacking purposes. The partial cover walls prevent inadvertent damage to the product in the carrier boxes. The lower side walls provide a space for ventilation between stacked boxes and a means of getting a hold of the bottom of a box to lift it off from the stack. The stacking stops assist in properly orienting the boxes one on top of the other. At the same time, the stop receiving access in the bottom of the boxes is no hindrance to conveyor or other uses.

The double box form is readily erected and, as assembled with the separator walls, serves as a double box for greater ease in packing, shipping, display, etc. The ability of the double box form to be readily separated to single boxes is highly advantageous. A customer's order for half of the packaged amount merely requires cutting the double box in half to provide a separate independent single carrier box.

The single box form has three of its four side walls formed from a single blank. The sides are each interlocked and securely held together. The end closing structure, provided by the divider wall blank 80 is positively engaged and interlocked with the other structure of the single box.

The partial cover walls of the boxes prevent unintentional disturbance of the farm produce carried. However the one cover wall 94 may be unlocked, if desired, to enable easier access to the product. When the cover walls are in place they also serve as temporary handles for moving the boxes about. They are securely fastened to the rest of the box and readily provide a finger grip under their inner edge.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

We claim:

1. A double compartment box, comprising; a bottom wall having side and end walls connected to the sides and ends thereof, said end walls including side wall engaging flaps integrally associated therewith, divider walls received intermediate said end closures and including side wall engaging flaps, said divider walls having a partial cover wall connected thereto and locking ears provided on the ends of said cover wall, hinged flaps connected to the upper edge of said side walls between said end and said divider walls and received in overlapping relation to said side walls, said hinged flaps engaging said side wall flaps of said end and said divider walls to said side wall and receiving said locking ears in locking engagement between said side walls and said hinged flaps, and means provided in said bottom wall for separating said double compartment box into two distinct and separate single compartment boxes with said divider walls serving as end closures therefore.

2. A double compartment box readily separable into two single compartment boxes, and comprising; a bottom wall forming member having side and end walls connected and disposed normal thereto, a partial cover wall connected to said end wall and disposed normal thereto, end wall engaging flaps formed from said side walls and disposed against said end wall, side wall engaging flaps formed from said partial cover wall and received over said end wall flaps and next adjacent said side walls, a side wall flap lock formed from said side walls and disposed to frictionally engage and temporarily hold a side edge of said side wall engaging flaps, a compartment forming end wall received normal to said side walls and spaced from said first mentioned end wall, said compartment forming wall including side wall engaging flaps and means of engagement therewith, overlapping side wall flaps hinged to the upper edges of said side walls and received next adjacent said side walls with said side wall flaps of said end cover wall and compartment wall trapped therebetween, and said compartment wall including a partial cover wall for said box and having locking ears formed at the ends thereof, said locking ears being received in locking engagement between said side wall and overlapping side wall flaps to complete the assembly of said box.

References Cited in the file of this patent

UNITED STATES PATENTS

| | | |
|---|---|---|
| 1,910,480 | Shoemaker | May 23, 1933 |
| 2,342,564 | Van Saun | Feb. 22, 1944 |
| 2,448,795 | Grecco | Sept. 7, 1948 |
| 2,843,307 | Goltz | July 15, 1958 |
| 2,868,430 | Hamilton | Jan. 13, 1959 |